(12) United States Patent
Sasaki

(10) Patent No.: US 7,210,310 B2
(45) Date of Patent: May 1, 2007

(54) REFRIGERANT CYCLE APPARATUS

(75) Inventor: Shigeharu Sasaki, Gunma (JP)

(73) Assignee: Sanyo Electric Co., Ltd., Osaka (JP)

( * ) Notice: Subject to any disclaimer, the term of this patent is extended or adjusted under 35 U.S.C. 154(b) by 79 days.

(21) Appl. No.: 11/072,404

(22) Filed: Mar. 7, 2005

(65) Prior Publication Data

US 2005/0204766 A1    Sep. 22, 2005

(30) Foreign Application Priority Data

Mar. 22, 2004    (JP)    ............... 2004-082404

(51) Int. Cl.
*F25B 1/00*    (2006.01)
(52) U.S. Cl. ........................... 62/498; 62/513
(58) Field of Classification Search ............... 62/259.2, 62/503, 513, 498, 505; 417/280
See application file for complete search history.

(56) References Cited

U.S. PATENT DOCUMENTS

| | | | | |
|---|---|---|---|---|
| 5,885,062 A | * | 3/1999 | Inoue et al. ................. | 417/280 |
| 5,996,365 A | * | 12/1999 | Tanaka ....................... | 62/196.4 |
| 6,237,351 B1 | * | 5/2001 | Itoh et al. ................... | 62/196.3 |
| 2003/0037562 A1 | * | 2/2003 | Honda et al. ............... | 62/324.1 |
| 2003/0117753 A1 | * | 6/2003 | Kato et al. ................... | 361/18 |

FOREIGN PATENT DOCUMENTS

JP    P 3341327    8/2002

* cited by examiner

*Primary Examiner*—Melvin Jones
(74) *Attorney, Agent, or Firm*—McDermott Will & Emery LLP

(57) ABSTRACT

There is provided, as an object of the present invention, a refrigerant cycle apparatus capable of smoothly cooling an inverter module for driving a motor of an electric compressor while preventing enlargement of an installation space as much as possible. In the refrigerant cycle apparatus which is constituted by sequentially connecting the electric compressor, a gas cooler, an electric expansion valve, an evaporator and an accumulator in an annular form through pipes, and driving a motor of the electric compressor by the inverter module, the gist of the apparatus is that heat exchange is carried out between the accumulator and the inverter module.

7 Claims, 3 Drawing Sheets

REFRIGERANT CYCLE APPARATUS

BACKGROUND OF THE INVENTION

The present invention relates to a refrigerant cycle apparatus constituted by sequentially connecting an electric compressor, a gas cooler, a pressure reducing device, an evaporator, and an accumulator in an annular form through pipes, and driving a motor of the electric compressor by an inverter module.

Recently, as an air conditioner for an electric automobile, a refrigerant cycle apparatus having an electric compressor mounted thereon to be driven by power from a battery has been developed. This refrigerant cycle apparatus is constituted by sequentially connecting the electric compressor, a gas cooler, a pressure reducing device (expansion valve or the like), an evaporator, and an accumulator in an annular form through pipes. A DC voltage from the battery is converted into a three-phase pseudo AC voltage by an inverter module and applied to the electric compressor, whereby a motor in the electric compressor is driven to start compression running of a refrigerant.

The inverter module is constituted by molding a switching element group comprising a switching element and a diode for switching serge absorption in a mold package (e.g., see Japanese Patent No. 3341327).

The inverter module generates heat when it is run, and thus the heat must be released. In other words, because of the heat generation, there is the danger that the heat may fill the inverter module to damage the switching element group. Thus, conventionally, a device for cooling the inverter module by air or water has been provided. The inverter module has been cooled by this device, thereby preventing a problem of damaging the inverter module.

However, when such a device for cooling the inverter module by air or water is installed, an installation space is considerably enlarged by the device, creating a difficulty of miniaturizing the refrigerant cycle apparatus.

SUMMARY OF THE INVENTION

A refrigerant cycle apparatus of the present invention is constituted by sequentially connecting an electric compressor, a gas cooler, a pressure reducing device, an evaporator and an accumulator in an annular form through pipes, and driving a motor of the electric compressor by an inverter module, wherein heat exchange is carried out between the accumulator and the inverter module.

According to the invention, heat generated from the inverter module can be released to the accumulator, and evaporation of the refrigerant in the accumulator can be promoted by the heat from the inverter module. Thus, it is possible to smoothly cool the inverter module and to miniaturize a device necessary for heat releasing.

According to the refrigerant cycle apparatus of the invention, the accumulator is disposed in a heat releasing plate mounted to the inverter module in a heat exchanging manner.

Further, according to the refrigerant cycle apparatus of the invention, the accumulator is mounted to the heat releasing plate by a mounting tool.

According to the invention, by mounting the accumulator to the heat releasing plate by the mounting tool in addition to the above, both can easily exchange heat.

According to the refrigerant cycle apparatus of the invention, a curved surface is formed in the heat releasing plate, and the cylindrical accumulator is brought into contact with the curved surface.

Further, according to the refrigerant cycle apparatus of the invention, a plane is formed in the accumulator, and the heat releasing plate is brought into contact with the plane.

According to the invention, in addition to the above, it is possible to smoothly and efficiently exchange heat between the heat releasing plate and the accumulator. Moreover, by forming the plane in the accumulator and bringing the heat releasing plate into contact with the plane, it is possible to smoothly and efficiently exchange heat between the heat releasing plate and the accumulator.

Furthermore, according to the refrigerant cycle apparatus of the invention, the pressure reducing device comprises an electric expansion valve, and a diaphragmming amount of the electric expansion valve is controlled in accordance with a temperature of a refrigerant sucked into the electric compressor to prevent an increase of the temperature to a predetermined value or higher.

According to the invention, it is possible to prevent an abnormal temperature increase of the electric compressor caused by an increase of the temperature of the sucked refrigerant while effectively cooling the inverter module.

DETAILED DESCRIPTION OF THE PREFERRED EMBODIMENTS

The present invention has been developed to solve the problems of the conventional art, and an object of the invention is to provide a refrigerant cycle apparatus capable of smoothly cooling an inverter module for driving a motor of an electric compressor while preventing enlargement of an installation space as much as possible. Hereinafter, the preferred embodiments of the present invention will be described in detail with reference to the accompanying drawings.

First Embodiment

Figure 1:
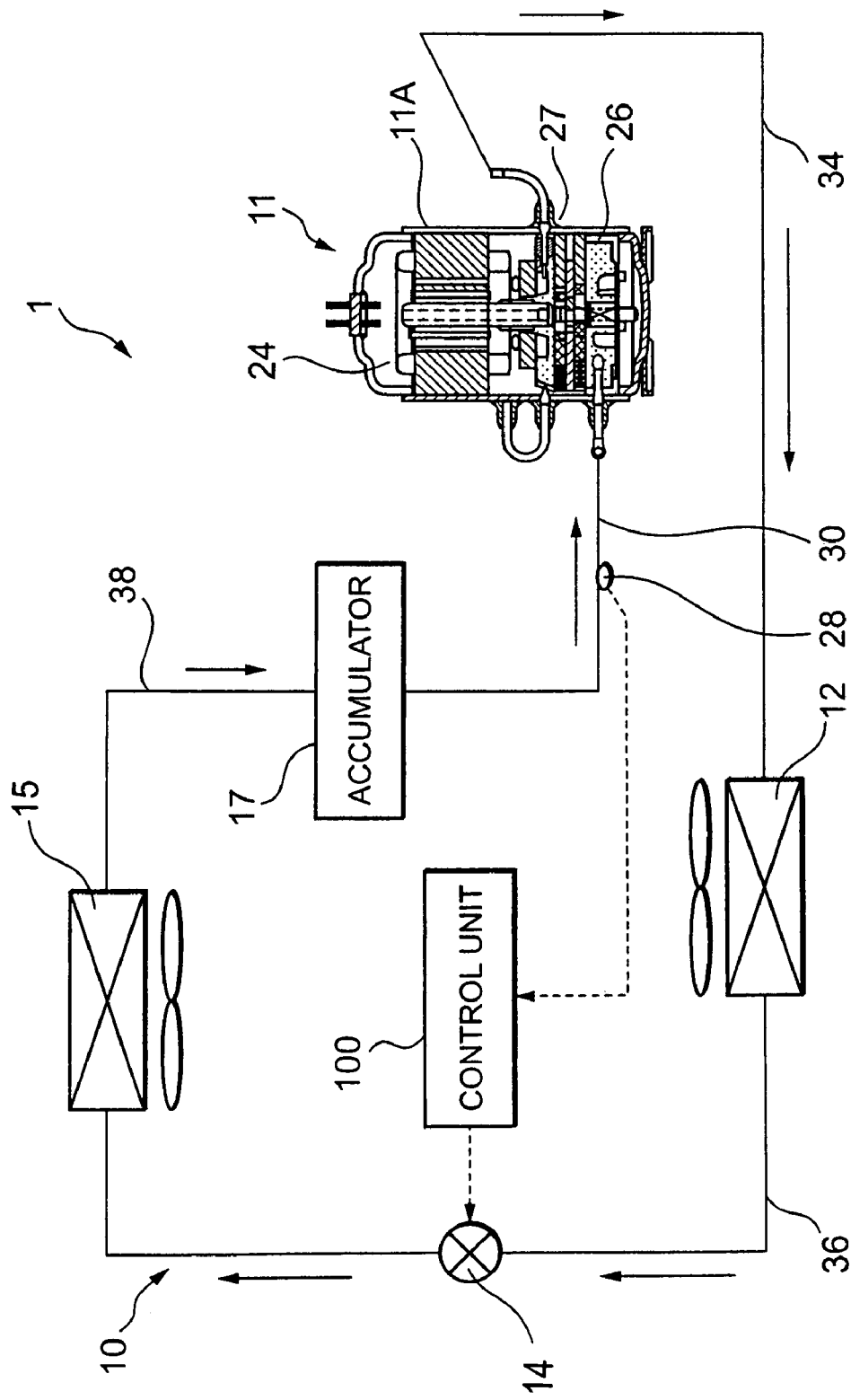
FIG. 1 is a refrigerant circuit diagram of a refrigerant cycle apparatus according to an embodiment of the present invention.
Figure 2:
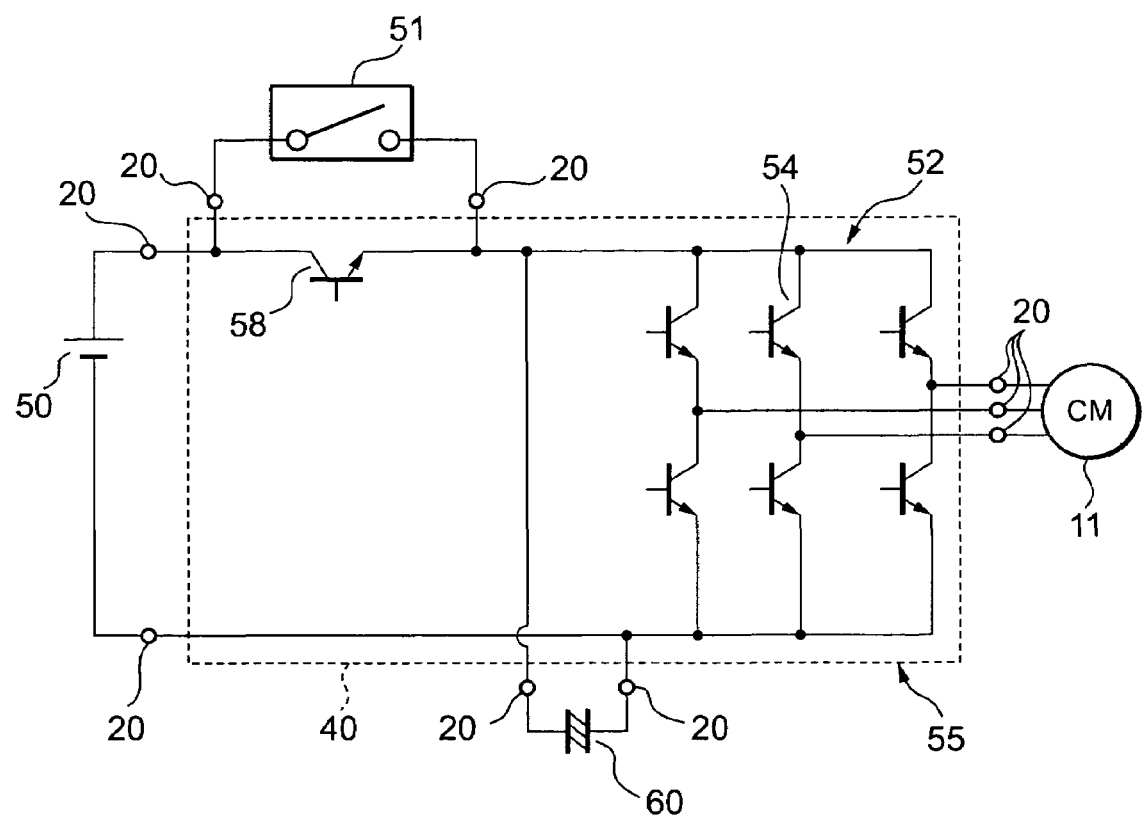
FIG. 2 is an electric circuit diagram of the refrigerant cycle apparatus of FIG. 1.

FIG. 1 is a refrigerant circuit diagram of a refrigerant cycle apparatus according to an embodiment of the present invention. FIG. 2 is an electric circuit diagram comprising an inverter module for driving an electric compressor. It is to be noted that the refrigerant cycle apparatus of the invention is used as an air conditioner for an electric automobile.

In FIG. 1, a reference numeral 10 denotes a refrigerant circuit of a refrigerant cycle apparatus 1. This refrigerant circuit 10 is constituted by sequentially connecting an electric compressor 11, a gas cooler 12, an electric expansion valve 14 as a pressure reducing device, an evaporator 15 and an accumulator 17 in an annular form through pipes. In other words, a refrigerant discharge pipe 34 of the electric compressor 11 is connected to an inlet of the gas cooler 12.

A refrigerant pipe 36 out of the gas cooler 12 is passed through the electric expansion valve 14 and connected to an inlet of the evaporator 15. The electric expansion valve 14 is connected to a control unit 100, and a diaphragmming amount of the expansion valve 14 is controlled by the control unit 100.

On the other hand, a pipe 38 out of the evaporator 15 is connected to an inlet of the accumulator 17. The accumulator 17 is provided to store a liquid refrigerant. By sucking a refrigerant from the evaporator 15 through the accumulator 17 into the electric compressor 11, it is possible to prevent a problem of sucking of the liquid refrigerant into the electric compressor 11 and liquid compression.

A refrigerant introduction pipe 30 of the electric compressor 11 is connected to an outlet of the accumulator 17. In this refrigerant introduction pipe 30, a refrigerant temperature sensor 28 is disposed to detect a temperature of the refrigerant sucked through the accumulator 17 into the electric compressor 11. The refrigerant temperature sensor 28 is connected to the control unit 100.

The control unit 100 controls the diaphragmming amount of the electric expansion valve 14 to prevent an increase of the refrigerant temperature to a predetermined value or higher in accordance with the sucked refrigerant temperature detected by the refrigerant temperature sensor 28.

The electric compressor 11 is a 2-stage compression type rotary compressor which comprises an electric element (motor) 24 and first and second rotary compression elements 26, 27 driven by the electric element in a sealed container 11A. A DC voltage from a battery 50 shown in FIG. 2 is converted into a three-phase pseudo AC voltage by an inverter module 55 and applied to the electric compressor 11, whereby the electric element 24 is driven.

Now, referring to FIG. 2, an electric circuit comprising the inverter module 55 for starting the electric compressor 11 will be described. In FIG. 2, a reference numeral 50 denotes a main battery of an electric automobile, which supplies power to the electric compressor 11 through an opening/closing device 51, the inverter module 55 or the like.

The battery 50 is a DC power source, and the voltage converted into the three-phase pseudo AC voltage is supplied to the electric compressor 11 by the inverter module 55 as described above. The inverter module 55 is constituted by disposing a switching element group 52 for converting a voltage into a three-phase pseudo AC voltage by switching in a mold package 40. This switching element group 52 comprises a switching element 54 and a diode (not shown) for switching serge absorption.

In the inverter module 55, an intrusion prevention switching element 58 is disposed on a circuit of a position between the switching element group 52 and the battery 50 of the DC power source. In other words, the inverter module 55 is constituted by integrally molding the intrusion prevention switching element 58 and the switching element group 52 in the mold package 40.

The intrusion prevention switching element 58 is provided to suppress an intrusion current flowing to a capacitor 60 and an intrusion voltage generated therein when the battery 50 is connected. At the time of connecting the battery 50, the intrusion prevention switching element 58 is controlled in an open state of the opening/closing device 51. By controlling the intrusion prevention switching element 58 to suppress an intrusion current, the switching element group 52 is protected.

In the mold package 40, pins 20 (not shown in FIG. 1) are disposed in a projecting manner to connect the switching element group 52 and the intrusion prevention switching element 58 in the mold package 40 to the battery 50, the opening/closing device 51, the capacitor 60 and the electric compressor 11 outside the mold package 40.

By these pins 20, it is possible to connect the devices in the mold package 40 to the devices outside the same without any difficulties.

Figure 3:
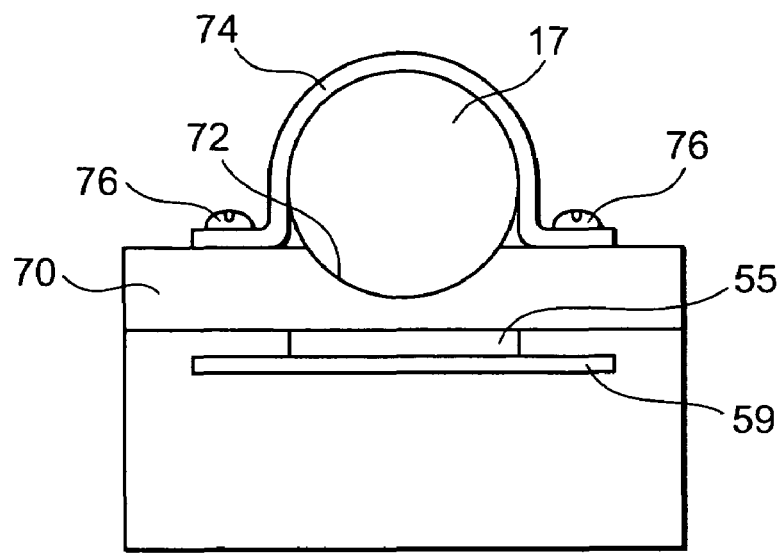
FIG. 3 is an expanded diagram of an accumulator and an inverter module of FIG. 1.

The inverter module 55 generates heat when it is run. Thus, a heat releasing plate 70 is mounted to release the heat. The heat releasing plate 70 is made of an aluminum plate material, and mounted to abut on the inverter module 55 disposed on a base 59 as shown in FIG. 3. Further, according to the invention, the accumulator 17 is disposed on a surface opposed to a surface of the heat releasing plate 70 abutting on the inverter module 55 to exchange heat.

That is, a curved surface 72 is formed on the surface opposed to the surface of the heat releasing plate 70 to which the inverter module 55 is mounted, and the cylindrical accumulator 17 is brought into contact with the curved surface 72. An outer periphery of the accumulator 17 is fixed by a mounting tool, e.g., a band 74, and both ends of the band 74 are mounted to the heat releasing plate 70 by screws 76 in this state.

Accordingly, by mounting the accumulator 17 to the heat releasing plate 70, the accumulator 17 and the inverter module 55 can exchange heat through the heat releasing plate 70.

An operation of the refrigerant cycle apparatus 1 constituted in the aforementioned manner will be described. When the battery 50 is connected, by the switching element group 52 of the inverter module 55, a DC voltage from the battery 50 is converted into a three-phase pseudo AC voltage by switching, and applied to the electric element 24 as the motor of the electric compressor 11. Thus, the electric element 24 of the electric compressor 11 is started, and a low-pressure refrigerant is sucked into a first rotary compression element 26 and compressed.

The refrigerant compressed by the first rotary compression element 26 to be set to intermediate pressure is sucked into a second rotary compression element 27 and compressed, thus becoming a high-temperature and high-pressure refrigerant gas. This gas is discharged through the refrigerant pipe 34 to the outside of the electric compressor 11, and flows into the gas cooler 12.

The refrigerant reaches the electric expansion valve 14 after its heat released by an air cooling system. The refrigerant is reduced in pressure at the electric expansion valve 14, and flows into the evaporator 15 in this state. Then, the refrigerant is evaporated by the evaporator 15, and exchanges heat with ambient air to exhibit a cooling effect.

The refrigerant out of the evaporator 15 next reaches the accumulator 17. Here, the refrigerant out of the evaporator 15 may be set not in a state of a complete gas but in a state mixed with a liquid refrigerant. In this case, by the accumulator 17, the liquid refrigerant can be stored therein. Accordingly, it is possible to prevent a problem of sucking of the liquid refrigerant into the electric compressor 11 and compression.

It is to be noted that the refrigerant gas out of the accumulator 17 repeats a cycle of being sucked through the refrigerant introduction pipe 30 into the first rotary compression element 26 of the electric compressor 11.

On the other hand, the inverter module 55 generates heat when it is run. As described above, however, by disposing the accumulator 17 in the heat releasing plate 70 in the heat exchanging manner, the inverter module 55 can exchange heat with the accumulator 17 through the heat releasing plate 70. Thus, it is possible to discharge heat generated from the inverter module 55 to the accumulator 17.

The accumulator 17 can promote evaporation of the liquid refrigerant stored in the accumulator by heat generated from the inverter module 55. Thus, it is possible to smoothly cool the inverter module 55 and to miniaturize the device necessary for heat releasing.

Additionally, according to the invention, both can easily exchange heat by the simple structure in which the accumulator 17 is mounted to the heat releasing plate 70 fixed to the inverter module 55.

Furthermore, by forming the curved surface 72 in the heat releasing plate 70, the cylindrical accumulator 17 can be brought into contact with the curved surface 72. Thus, it is possible to smoothly and efficiently exchange heat between the heat releasing plate 70 and the accumulator 17.

On the other hand, the diaphragmming amount of the electric expansion valve 14 is controlled by the control unit 100 based on the sucked refrigerant temperature detected by the refrigerant temperature sensor 28 as described above. That is, when the refrigerant temperature detected by the refrigerant temperature sensor 28 rises to approach a predetermined value, the control unit 100 reduces the diaphragmming amount of the electric expansion valve 14 (increasing an opening degree of the expansion valve 14) to supply a greater amount of a refrigerant to the evaporator 15. Thus, it is possible to lower the temperature of the refrigerant discharged from the evaporator 15 and sucked into the electric compressor 11.

If control is not performed in accordance with the temperature of the refrigerant sucked into the electric compressor 11 as in the conventional case, when the temperature of the refrigerant sucked into the electric compressor 11 rises, a temperature of the electric compressor 11 abnormally increases to excessively heat its electric element, causing a problem of obstructing the running of the electric compressor. In this case, there is the danger that the inverter module 55 connected to the electric compressor 11 will be excessively heated to be damaged. Besides, as a temperature of the accumulator 17 which becomes a passage of the sucked refrigerant rises, there is the danger that heat will be conducted through the heat releasing plate 70 to the inverter module 55.

However, by controlling the diaphragmming amount of the electric expansion valve 14 in accordance with the temperature of the refrigerant sucked into the electric compressor 11 to prevent an increase of the sucked refrigerant temperature to a predetermined value or higher, it is possible to prevent the aforementioned problem.

Second Embodiment

Figure 4:
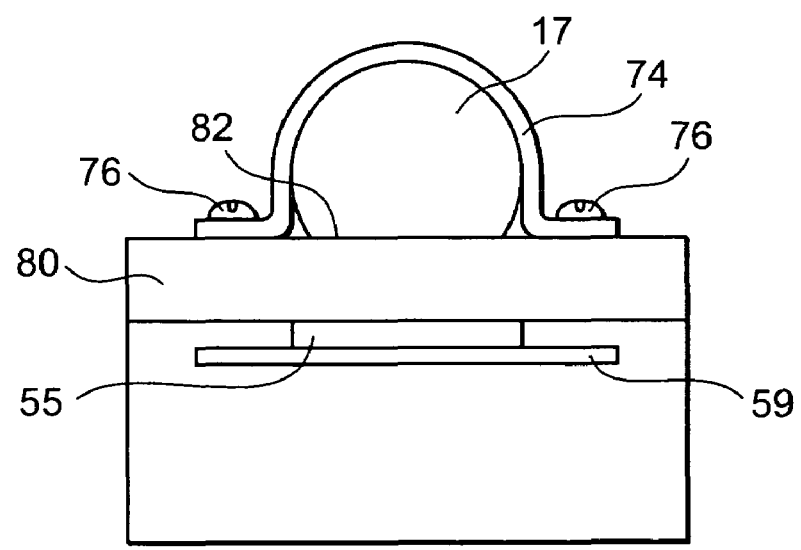
FIG. 4 is an expanded diagram of an accumulator and an inverter module according to another embodiment.

According to the aforementioned embodiment, the heat releasing plate 70 and the accumulator 17 are constituted such that the curved surface 72 is formed in the heat releasing plate 70 and the cylindrical accumulator 17 is brought into contact with the curved surface 72. However, for example, a part of the accumulator may be formed in a plane 82 as shown in FIG. 4, and a heat releasing plate 80 may be brought into contact with the plane 82. In this case, effects similar to those of the first embodiment can be provided.

What is claimed is:

1. A refrigerant cycle apparatus constituted by sequentially connecting an electric compressor comprising a motor, a gas cooler, a pressure reducing device, an evaporator, and an accumulator in an annular form through pipes,
   wherein the motor of the electric compressor is electrically driven by an inverter module, and
   wherein heat exchange is carried out between the accumulator and the inverter module.

2. The refrigerant cycle apparatus according to claim 1, wherein the accumulator is disposed in a heat releasing plate mounted to the inverter module in a heat exchanging manner.

3. The refrigerant cycle apparatus according to claim 2, wherein the accumulator is mounted to the heat releasing plate by a mounting tool.

4. The refrigerant cycle apparatus according to claim 2 or 3, wherein a curved surface is formed in the heat releasing plate, and the cylindrical accumulator is brought into contact with the curved surface.

5. The refrigerant cycle apparatus according to claim 2 to 3, wherein a plane is formed in the accumulator, and the heat releasing plate is brought into contact with the plane.

6. The refrigerant cycle apparatus according to any one of claims 1 to 3, wherein the pressure reducing device comprises an electric expansion valve, and a diaphragming amount of the electric expansion valve is controlled in accordance with a temperature of a refrigerant sucked into the electric compressor to prevent an increase of the temperature to a predetermined value or higher.

7. The refrigerant cycle apparatus according to claim 1, wherein heat from the inverter module promotes evaporation of a refrigerant in the accumulator.

* * * * *